(12) United States Patent
Sartini

(10) Patent No.: US 8,519,266 B2
(45) Date of Patent: Aug. 27, 2013

(54) REMODELING LUMINAIRE FIXTURE

(75) Inventor: Eugene Sartini, Fall River, MA (US)

(73) Assignee: Koninklijke Philips N.V., Eindhoven (NL)

( * ) Notice: Subject to any disclaimer, the term of this patent is extended or adjusted under 35 U.S.C. 154(b) by 311 days.

(21) Appl. No.: 13/093,511

(22) Filed: Apr. 25, 2011

(65) Prior Publication Data
US 2012/0267139 A1 Oct. 25, 2012

(51) Int. Cl.
*H02B 1/30* (2006.01)
(52) U.S. Cl.
USPC ............... 174/61; 174/50; 174/491; 174/503; 362/362; 362/365; 362/371
(58) Field of Classification Search
USPC .................. 174/480, 481, 50, 520, 61, 17 R, 174/484, 491, 503, 535, 559, 58, 57; 220/3.2–3.9; 362/362, 364, 365, 368, 371, 362/382; 248/342, 343
See application file for complete search history.

(56) References Cited

U.S. PATENT DOCUMENTS

| | | | |
|---|---|---|---|
| 3,683,173 A | 8/1972 | Guth | |
| 5,374,812 A * | 12/1994 | Chan et al. | 220/3.6 |
| 5,452,816 A * | 9/1995 | Chan et al. | 220/3.8 |
| 6,364,511 B1 * | 4/2002 | Cohen | 362/365 |
| 6,371,630 B1 * | 4/2002 | Unger | 362/365 |
| 6,755,558 B2 * | 6/2004 | Krietenstein et al. | 362/365 |
| 7,993,037 B1 * | 8/2011 | Buse | 362/365 |
| 8,297,804 B2 * | 10/2012 | Buse | 362/364 |
| 2010/0238672 A1 | 9/2010 | Wu | |

FOREIGN PATENT DOCUMENTS

| | | |
|---|---|---|
| CN | 1087708 A | 6/1994 |
| CN | 201439896 U | 4/2010 |

* cited by examiner

*Primary Examiner* — Angel R Estrada
(74) *Attorney, Agent, or Firm* — Mark L. Beloborodov

(57) ABSTRACT

A remodeler luminaire fixture (10) having a fixture frame (14) including a junction box (24), the fixture frame having at least one long dimension, a driver housing mounting bracket (42) connected to one of the junction box and the fixture frame, the driver housing mounting bracket generally aligned with the fixture frame, a driver housing (50) pivotally connected to the driver housing mounting bracket wherein the driver housing is pivotal between a first position and a second position between zero and 190 degrees from the first position.

24 Claims, 6 Drawing Sheets

REMODELING LUMINAIRE FIXTURE

CROSS-REFERENCE TO RELATED DOCUMENTS

None

TECHNICAL FIELD

This invention pertains to a remodeler luminaire fixture. More specifically, the invention pertains to a remodeler luminaire fixture which is formed of a structure that may be used with a small, existing ceiling aperture and positioned between joists of small spacing distance or adjacent a vertical wall.

BACKGROUND

Recessed luminaires are known in the prior art and are highly desirable to use. They are preferable because the fixture structure is hidden within the ceiling and provide for a wide variety of illumination patterns for various uses. These recessed luminaires are also highly desirable to use during remodeling projects to replace older luminaires when a ceiling is not being replaced.

In the instance where existing ceiling apertures are utilized with new luminaire fixtures, a problem exists in that the fixtures must be positioned through the existing ceiling aperture, which often times may be smaller than the fixture envelope or boundary. Thus, various fixtures have been formed which allow positioning within small ceiling apertures. However such fixtures are difficult to use with small apertures and in areas of small spacing between joists.

It would be desirable to overcome these and other deficiencies in the known prior art to provide a luminaire fixture which is easily positionable through existing small ceiling apertures and further may be utilized, if necessary, in locations where ceiling joists are tightly spaced or adjacent to vertical walls.

SUMMARY

A remodeler luminaire fixture, comprises a fixture frame including a junction box, the fixture frame having at least one long dimension, a driver housing mounting bracket connected to one of the junction box and the fixture frame, the driver housing mounting bracket generally aligned with the fixture frame, a driver housing pivotally connected to the driver housing mounting bracket wherein the driver housing is pivotal between a first position and a second position between zero and 190 degrees from the first position. The remodeler luminaire fixture wherein the driver housing mounting bracket has a wire way cover connected to the driver housing mounting bracket. The remodeler luminaire fixture wherein the wire way cover defines a wire way between the driver housing mounting bracket and the wire way cover. The remodeler luminaire fixture further comprising a spacer disposed opposite the driver housing mounting bracket. The remodeler luminaire fixture wherein the driver housing is captured between the driver housing mounting bracket and the spacer. The remodeler luminaire fixture wherein the driver housing is formed of a single structure. The remodeler luminaire fixture wherein the driver housing is formed of multiple structures. The remodeler luminaire fixture further comprises a stop on one of the driver housing and the driver housing mounting bracket and an engagement structure on the other of the driver housing and the driver housing mounting bracket. The remodeler luminaire fixture wherein wiring passes between a driver in the driver housing and said junction box.

A remodeler luminaire fixture comprises a driver housing having at least one long dimension, a driver housing mounting bracket pivotally connected to said driver housing for pivotal motion of said driver housing relative to at least one of a frame and a junction box and wherein said at least one long dimension may be aligned with said at least one of a frame and junction box, the junction box connected to the frame, the driver housing mounting bracket connected to one of the junction box and the frame. The remodeler luminaire fixture further comprising a wire way cover on the driver housing mounting bracket. The remodeler luminaire fixture wherein the driver housing comprises a first portion and a second portion. The remodeler luminaire fixture of wherein the driver housing comprises a one-piece structure. The remodeler luminaire fixture further comprising a pivotal connection between the driver housing and the driver housing mounting bracket. The remodeler luminaire fixture wherein the pivotal connection further comprising a spacer capturing the driver housing between the driver housing mounting bracket and the spacer. The remodeler luminaire fixture wherein the spacer has an aperture allowing wiring to pass from the luminaire driver to the junction box. The remodeler luminaire fixture wherein the driver housing mounting bracket defines a passage for a wire way. The remodeler luminaire fixture further comprising a luminaire driver one of either in the driver housing or externally mounted to the driver housing.

A remodeler luminaire fixture comprises a frame having a junction box connected to the frame, a driver housing mounting bracket mounted to one of the junction box and the frame, a driver housing pivotally connected to the driver housing mounting bracket, the driver housing movable between a first position and a second position up to about ninety (90) degrees away. The remodeler luminaire fixture further comprising a wire way extending between the driver housing and a junction box. The remodeler luminaire fixture further comprising stops on one of the driver housing and the driver housing mounting bracket. The remodeler luminaire fixture of wherein the axis of rotation of the driver housing is vertical. The remodeler luminaire fixture wherein the axis of rotation of the driver housing is other than vertical. The remodeler luminaire fixture wherein the junction box has a pivotable door.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
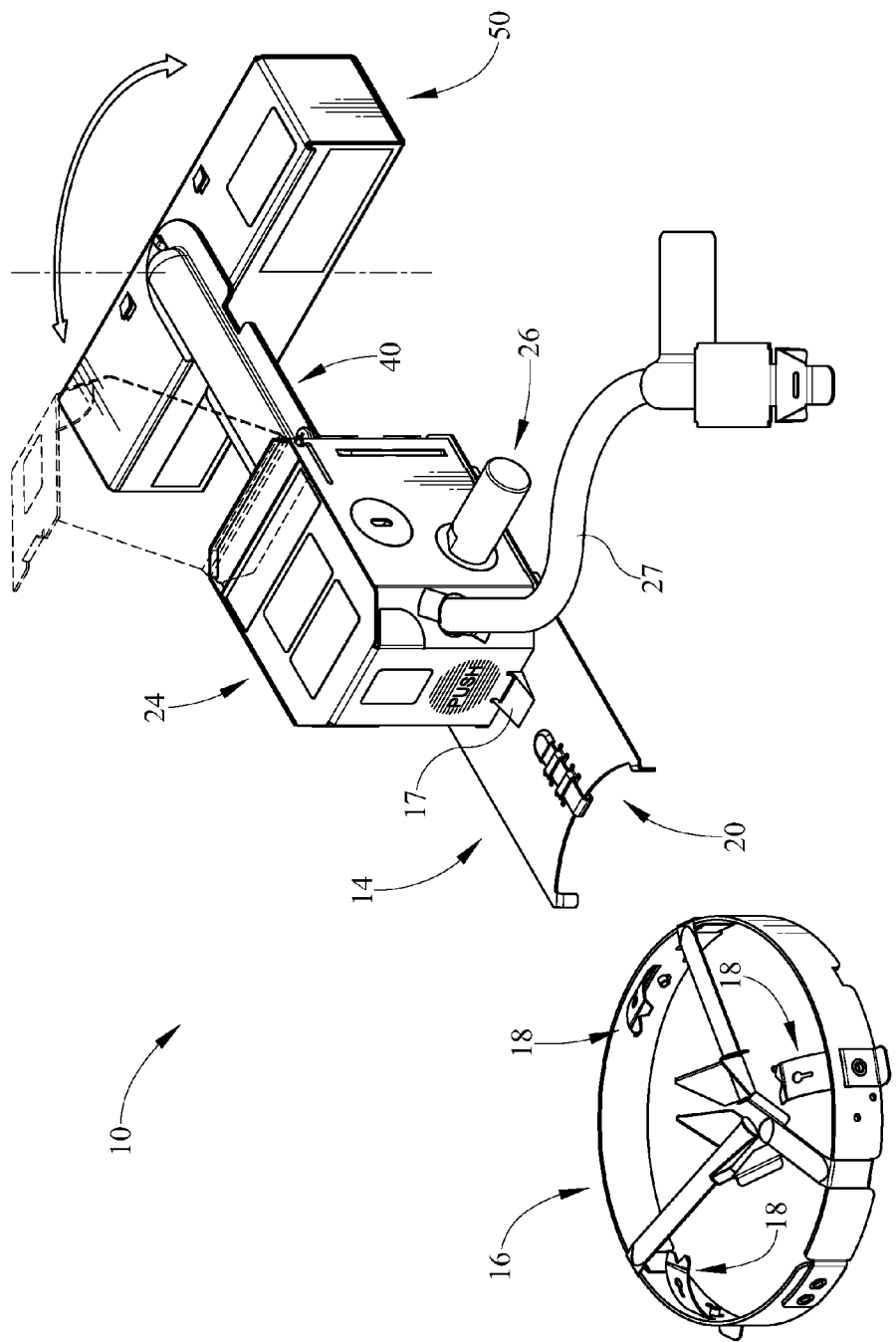
FIG. 1 is a perspective view of the partially assembled remodeler luminaire fixture.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-6, a remodeler luminaire fixture is depicted in various views. The exemplary remodeler fixture is formed to allow installation in a small existing ceiling aperture despite having a driver with at least one dimension that is equal to or larger than the ceiling aperture diameter. The driver housing is movable from a first position allowing passage through the ceiling aperture to a second position once the fixture is positioned above the ceiling aperture and a larger clearance is available between ceiling joists. The term housing should be construed to mean both an enclosure and a structure to which a driver may be attached.

Referring now to FIG. 1, a perspective view of the remodeler luminaire fixture 10 is depicted. The fixture 10 comprises a frame 14 which is generally a planar structure and which may vary in shape. The frame 14 is generally rectangular with an arc or rounded end. The long sides of the frame 14 extend in a longitudinal direction defined parallel to the longitudinal edges. However, it should be understood the frame shape is not limited. The frame 14 is connected to a reflector ring 16 for positioning of a luminaire reflector (not shown). The reflector ring 16 may be of various shapes and, as shown in the exemplary embodiment, is circular with a plurality of retaining features 18 extending radially inward to seat or capture the reflector therein. Portions of the retaining features 18 on the outside of the ring 16 may be seated against the ceiling aperture edge to ensure the ring doesn't pass through the ceiling aperture.

With use of the circular shaped reflector ring 16, the frame 14 includes a circular or arc shaped end 20 to improve the fit of the frame 14 and reflector ring. The frame 14 shape may vary as previously described and therefore the arc shaped end 20 may be altered while staying within the scope of the embodiment.

Figure 2:
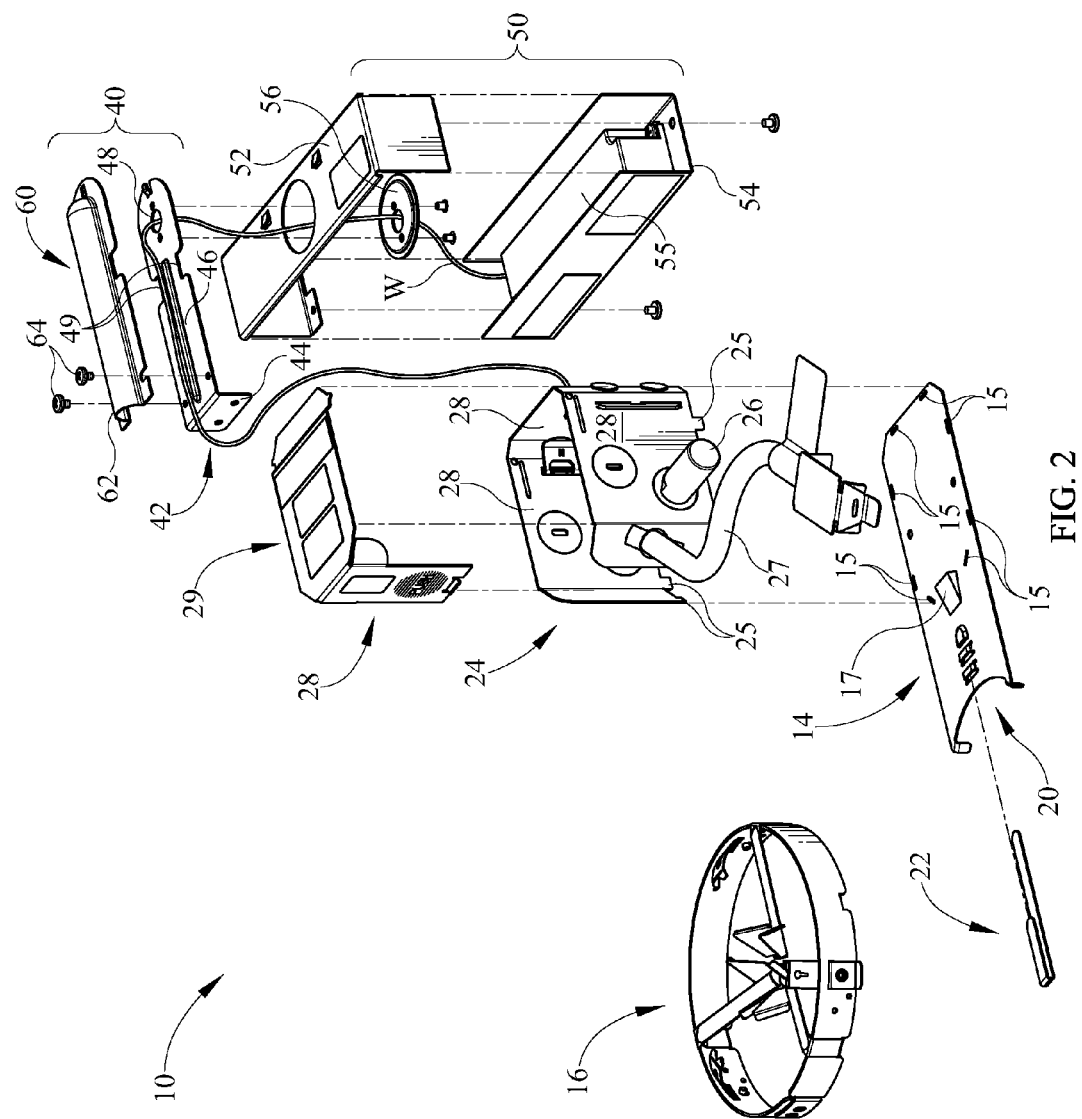
FIG. 2 is an exploded perspective view of the remodeler luminaire fixture.

The frame 14 further comprises a junction box 24 extending from an upper surface of the frame 14. The junction box 24 provides a location to connect power supply wiring from the power source, with the wiring of a luminaire driver 50 (FIG. 2). The junction box 24 may be formed of one or more pieces of metal and may be formed integrally with the frame 14 or may be formed separately and connected to the frame 14. In the exemplary embodiment, the junction box 24 is connected with tabs and a catch 17 allowing access to the interior of the junction box 24. Extending from the junction box 24 is a power supply wire 27. This provides power supply into the junction box 24 for electrical connection with a driver 51 (FIG. 2) to power the luminaire, for example LED array, fluorescent, incandescent or other type of luminaire.

A thermal protection element 26 extends from the junction box 24. The thermal protection 26 is utilized to prevent fire situations in recessed lighting and may consist of various structures including resistive heating elements or a bi-metal switch and leads to connect to the luminaire circuitry. The thermal protection circuit 26 is normally closed allowing electricity to pass there through but may open if excessive heat is detected, thus closing the circuit and inhibiting operation of the luminaire. The thermal protection or resistive heating element opens if the operating temperature of the luminaire rises beyond a predetermined value. Alternatively, the thermal protection may also include a sensitive external switch circuit which trips or opens if the luminaire is over lamped or insulation is disposed around the outside of the luminaire fixture directly adjacent the structure 10.

Extending from one of the junction box 24 and frame 14, and generally aligned with the frame 14 is a driver housing mounting bracket assembly 40. The driver housing mounting bracket assembly 40 is an elongated structure connected at one end to either the junction box 24 or the frame 14. At an opposite end, the mounting bracket assembly 40 allows pivotal motion of the driver housing 50 so that the driver housing 50 may be rotated between at least a first position and a second position which may be up to about one hundred and ninety degrees from the first position. An arrow depicts the rotation directions of the exemplary embodiment. In the embodiment depicted, the axis of pivoting motion of the driver housing 50 is a vertical axis, shown in broken line, extending through the end of the driver housing mounting bracket 40 opposite the junction 24. According to alternate embodiments, the structure so that the axis is other than vertical but the driver housing 50 may be aligned with the bracket 40.

Referring now to FIG. 2, an exploded perspective view of the remodeler luminaire fixture 10 is depicted. At the left-hand end of the fixture, the reflector ring 16 is exploded from the frame 14. A tongue 22 is shown exploded from the arc shaped end 20 of the frame 14 although other means for connection may be utilized. The tongue 22 is connected to the frame 14 along the top surface thereof. The lower portion of the tongue 22 is folded from its depicted position to wrap around the ring 16 thus connecting the frame 14 and the ring 16. The frame 14 includes an exemplary plurality of apertures 15 for receiving junction box tabs 25 there through. The tabs 25 may be folded once extending through the apertures 15 in order to retain the junction box 24 to the frame 14. The exemplary junction box 24 is defined by a plurality of vertically extending sidewall 28. The junction box 24 further comprises a top wall 29 and sidewall 28 depending therefrom to a door which enclose the junction box 24. The top wall 29 and depending side wall 28 are pivotally connected to the remaining structure of the junction box 24 to allow opening or access to the junction box 24 once the junction box is connected to the frame 14, as shown in FIG. 1 in broken line. The depending sidewall 28 is closed and released at the catch 17 according to the exemplary structure.

Extending from one of the junction box 24 or frame 14 is a driver housing mounting bracket assembly 40. The assembly 40 extends from the frame 14 in the longitudinal direction. This maintains the narrow profile of the fixture allowing passage through a small ceiling aperture in a remodeler situation. The assembly 40 comprises two parts according to the exemplary embodiment. A mounting bracket 42 extends from the junction box 24 and is connected thereto by a tab 44. Extending from the tab 44 is a body 46 having a generally longitudinal axis. Near an end of the body 46 opposite the tab 44 is an aperture 48 defining a wire pathway so that a wire from a driver located within a driver housing 50 can extend through an aperture 48 and along a mounting bracket 42 into the junction box 24. Above the mounting bracket 42 is a wire way cover 60 which is fastened to the mounting bracket 42. The wireway cover is also defined by a longitudinally extending body 62 which has an arched portion to aid in defining the wireway between the driver housing 50 and the junction box 24. The wireway cover 60 is fastened to the mounting bracket 42 but may alternatively be connected thereto in various forms or fashions and further may be formed integrally with the mounting bracket 42. A two piece structure, however, allows for easier installation and positioning of the wire W along the bracket and through the wireway. Multiple wires may be utilized, although not shown for clarity, from the junction box 24 to the driver 51, and from the driver 51 to the junction box 24 and on to the luminaire to power a light source.

Beneath the mouthing bracket assembly 40 is driver housing 50. The housing 50 of the exemplary embodiment is formed of a first upper structure 52 and a second lower structure 54 which define an enclosure when placed together. These structures may be fastened or connected by other means. Alternatively, a one piece driver housing 50 may also be formed in which utilizes, for example, a living hinge or other foldable structure in order to close the housing 50 once the driver 55 is positioned therein. In either event, the driver housing 50 is rotatable at the connection with the mounting bracket assembly 40 in order to allow rotation or pivotal motion of the driver housing 50. This allows positioning to form a narrow structure or envelope for passage through the small ceiling aperture and subsequent rotation of the driver housing 50 once the device is located above the ceiling aperture. Additionally, this allows usage in areas where joist spacing is minimal.

Figure 3:
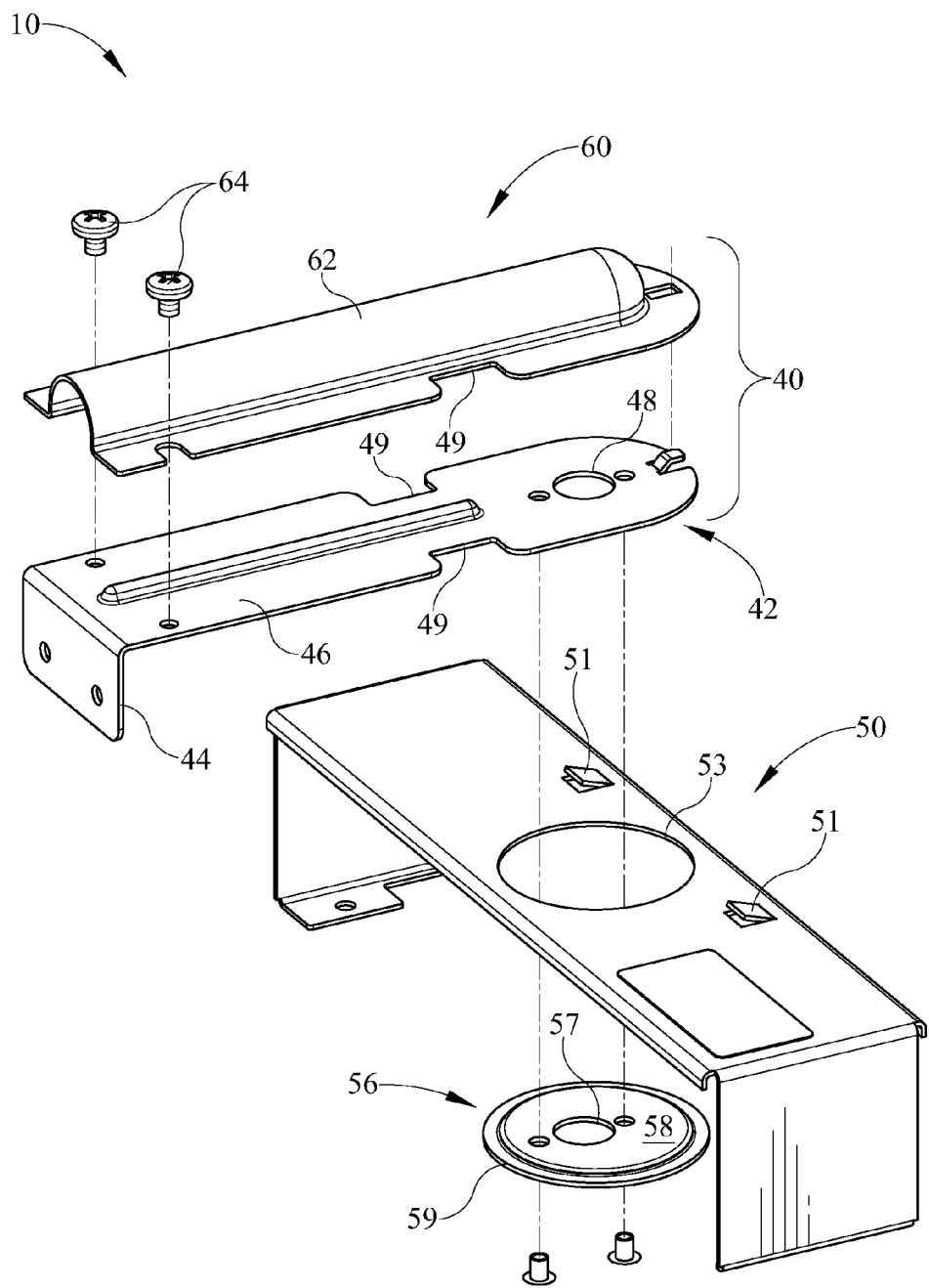
FIG. 3 is an exploded perspective view of components providing motion between a driver housing and mounting bracket.

Referring now to FIG. 3, an exploded perspective view of the pivoting structure between the mounting assembly 40 and the driver housing 50 is depicted. A spacer 56 is circular in shape and has a diameter which is greater than that of a spacer aperture 53 and a driver housing 50. The spacer 56 has an upper or raised surface 58 which extends upwardly through the spacer aperture 53 and defines an outer rim 59 of a diameter greater than the aperture 53. The spacer 56 is attached to the mounting bracket 42 by way of fasteners extending through the aperture 53. This allows pivotal motion of the driver housing 50 relative to the bracket 42. Although this pivotal structure is described, various other pivotal structures may be utilized and should be considered with the scope of the instant device. The driver housing 50 is also shown having at least one stop 51 extending from an upper surface thereof. The stops 51 engage the notches 49 in the bracket 42 in order to limit rotational movement of the driver housing 50 relative to the bracket 42 and assembly 40 as a whole.

Figure 4:
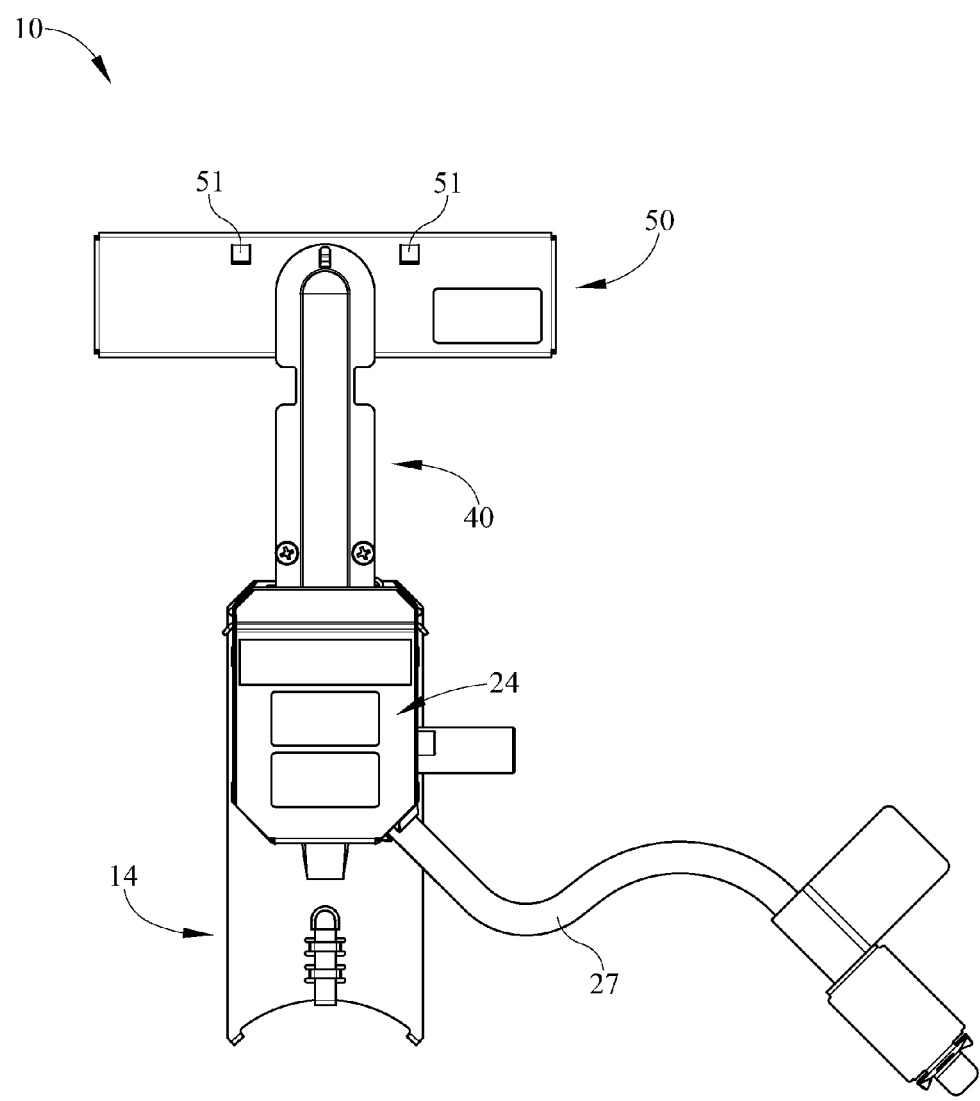
FIG. 4 is a top view of the exemplary remodeler luminaire fixture shown in a position after passing through a small ceiling aperture.

Referring now to FIG. 4, an upper view of the luminaire fixture 10 is depicted. The longitudinal extension of the bracket assembly 40 and the frame 14 provides a narrow envelope of the apparatus 10. The housing 50 is shown rotated out of alignment with the frame 14 and bracket 40. In this view, the housing 50 is rotated to a position after the fixture 10 is passed through a ceiling aperture.

Figure 5:
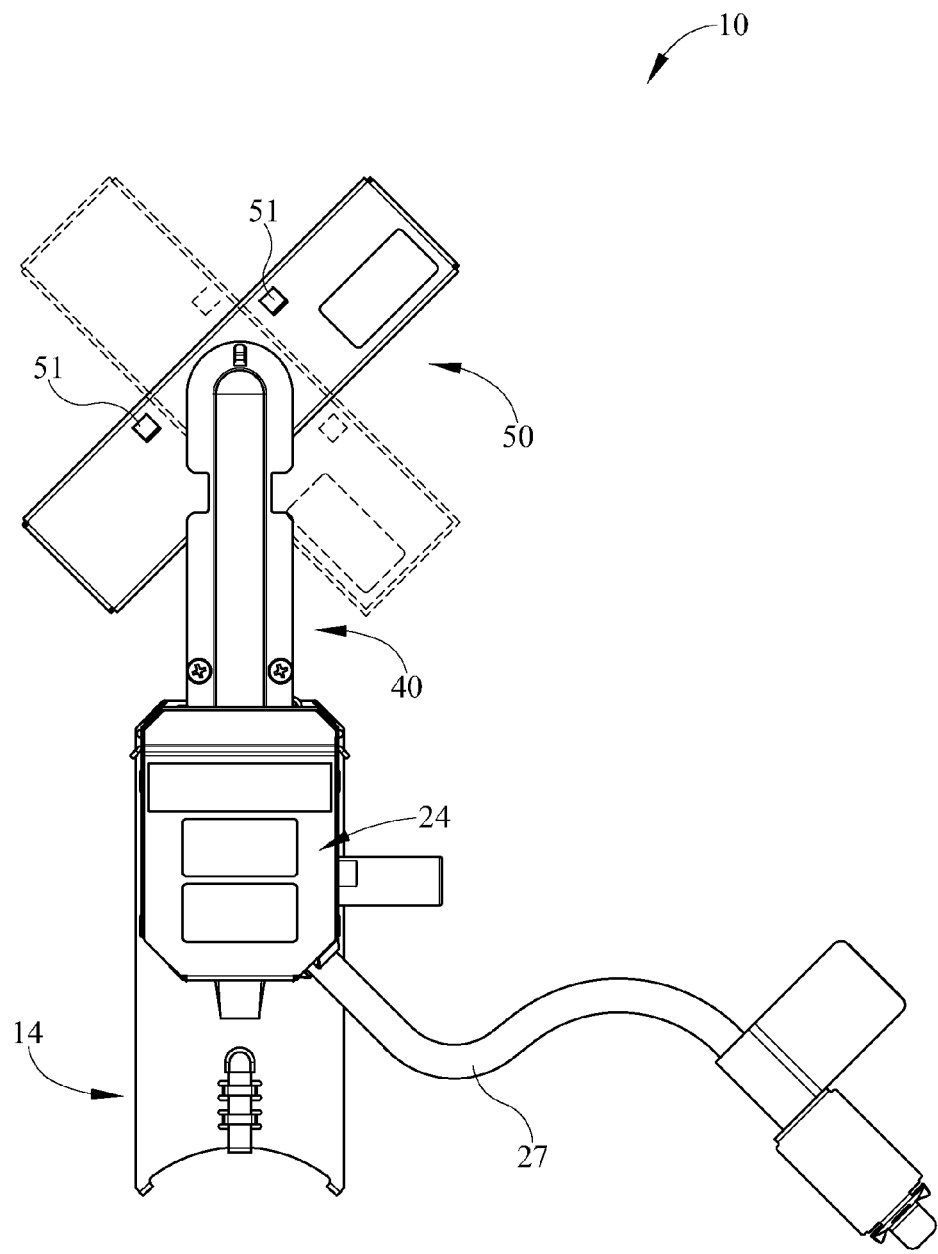
FIG. 5 is a top view of the exemplary remodeler luminaire fixture with the driver housing in multiple positions; and, FIG. 6 is a partially exploded perspective view of an alternative remodeler luminaire fixture.

In comparison to FIG. 4, FIG. 5 depicts a second top view with the driver housing 50 rotated to a second position. The driver housing 50 is shown in a first position in solid lines and a second position in broken lines. The broken line housing is shown rotated about ninety degrees from the solid line housing 50. The exemplary housing 50 may rotate up to about 190 degrees. The stops 51 on the housing 50 engage the bracket assembly 40 to inhibit over-rotation of the housing 50. One-skilled in the art will understand that at a position between the solid line position and the broken line position, the housing 50 will be aligned in the longitudinal direction with frame 14 and bracket assembly 40. In such a position, or slightly rotated therefrom, the fixture 10 may be positioned though a small ceiling aperture in a remodeling job. Additionally, the housing 50 may be rotated as much as possible in jobs where small joist spacing is found in the ceiling of the remodeling job or adjacent a vertical wall. It should also be understood that this and other embodiments are contemplated wherein the axis of rotation of the driver housing 50 may be varied from its current position so that the driver housing 50 rotates in an alternate plane and may be aligned with the bracket assembly 40.

Figure 6:
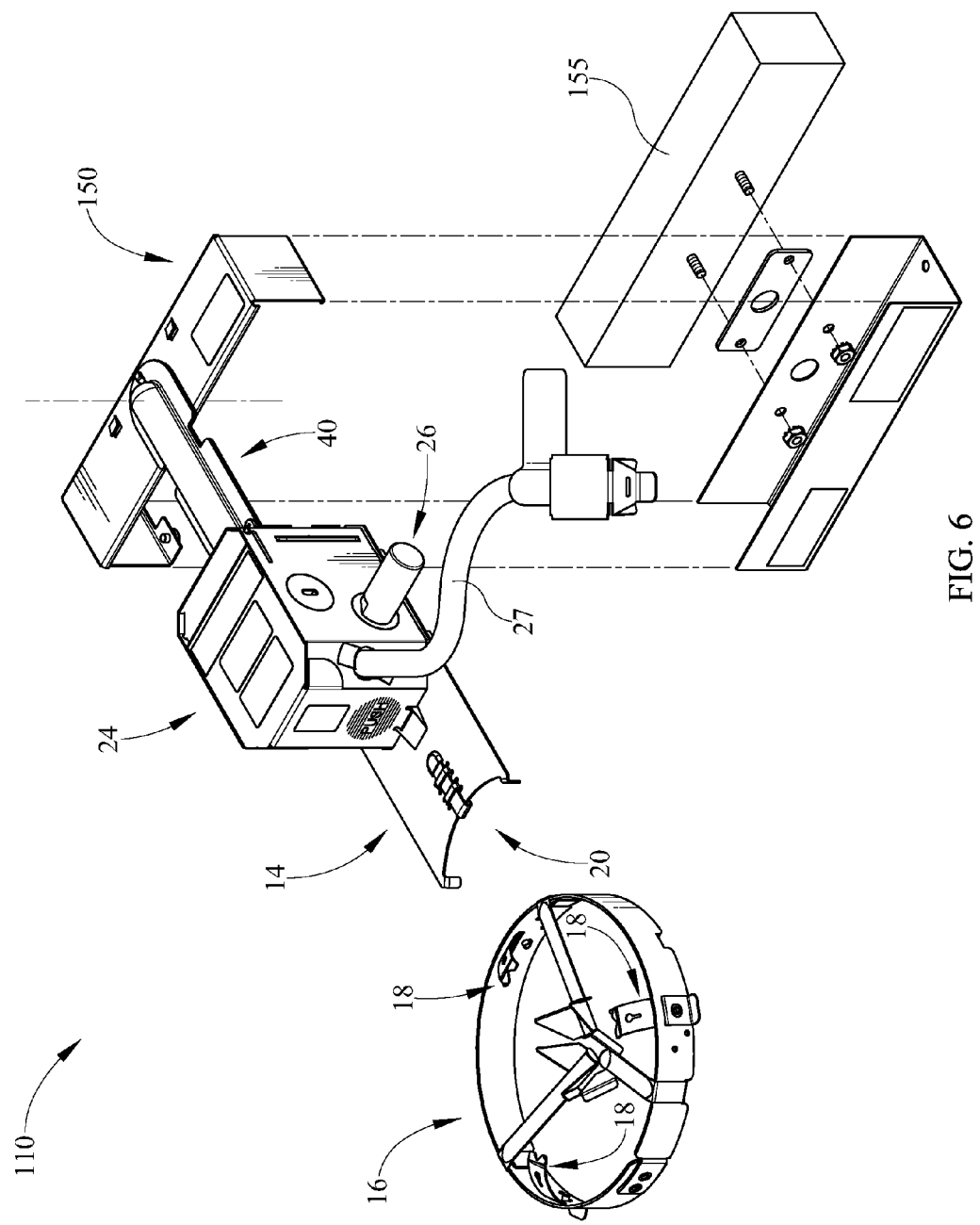

Referring now to FIG. 6, a perspective view of an alternative luminaire fixture 110 is depicted. In this embodiment, an alternate housing 150 is shown. The housing 150 is used with dimming type or otherwise oversized driver 155 which cannot be enclosed. In the instant embodiment, the housing is used as a connection means rather than an enclosing structure. With the driver 155 connected to the outside of the housing 150, the driver 155 can still be rotated allowing passage through a small remodeling ceiling aperture. However, once the structure passes through the ceiling aperture, the housing 150 and driver 155 may be rotated. The driver 155 may be connected in a variety of ways. For example, the exemplary embodiment uses two threaded studs extending through the housing 150 and fastened on the inside of the housing 150. However this is merely exemplary and various structures may be utilized to perform this function in various ways.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A remodeler luminaire fixture (10), comprising:
 a fixture frame (14) including a junction box (24) said fixture frame having at least one long dimension;
 a driver housing mounting bracket (42) connected to one of said junction box and said fixture frame, said driver housing mounting bracket generally aligned with said fixture frame;
 a driver housing (50) pivotally connected to said driver housing mounting bracket wherein said driver housing is pivotal between a first position and a second position between zero and 190 degrees from said first position.

2. The remodeler luminaire fixture of claim 1, said driver housing mounting bracket having a wire way cover (60) connected to said driver housing mounting bracket.

3. The remodeler luminaire fixture of claim 2, said wire way cover defining a wire way between said driver housing mounting bracket and said wire way cover.

4. The remodeler luminaire fixture of claim 1 further comprising a spacer (56) disposed opposite said driver housing mounting bracket.

5. The remodeler luminaire fixture of claim 4, said driver housing captured between said driver housing mounting bracket and said spacer.

6. The remodeler luminaire fixture of claim 1, said driver housing formed of a single structure.

7. The remodeler luminaire fixture of claim 6, said driver housing formed of multiple structures (52,54).

8. The remodeler luminaire fixture of claim 1 further comprising a stop (51) on one of said driver housing and said driver housing mounting bracket and an engagement structure (49) on the other of said driver housing and said driver housing mounting bracket.

9. The remodeler luminaire fixture of claim 1 wherein wiring (w) Passes between a driver in said driver housing and said junction box.

10. A remodeler luminaire fixture, comprising:
- a driver housing (50) having at least one long dimension;
- a driver housing mounting bracket (42) pivotally connected to said driver housing for pivotal motion of said driver housing relative to at least one of a frame (14) and a junction box (24) and wherein said at least one long dimension may be aligned with said at least one of said frame and junction box;
- said junction box connected to said frame, said driver housing mounting bracket connected to one of said junction box and said frame.

11. The remodeler luminaire fixture of claim 10 further comprising a wire way cover (60) on said driver housing mounting bracket.

12. The remodeler luminaire fixture of claim 10 wherein said driver housing comprises a first portion (52) and a second portion (54).

13. The remodeler luminaire fixture of claim 10 wherein said driver housing comprises a one-piece structure.

14. The remodeler luminaire fixture of claim 10 further comprising a pivotal connection between said driver housing and said driver housing mounting bracket.

15. The remodeler luminaire fixture of claim 14, said pivotal connection further comprising a spacer (56) capturing said driver housing between said driver housing mounting bracket and said spacer.

16. The remodeler luminaire fixture of claim 14, said spacer having an aperture (53) allowing wiring (w) to pass from said luminaire driver to said junction box.

17. The remodeler luminaire fixture of claim 10, said driver housing mounting bracket defining a passage for a wire way.

18. The remodeler luminaire fixture of claim 10 further comprising a luminaire driver (55) one of either in said driver housing or externally mounted to said driver housing.

19. A remodeler luminaire fixture (10), comprising:
- a frame (14) having a junction box (24) connected to said frame;
- a driver housing mounting bracket (42) mounted to one of said junction box and said frame;
- a driver housing (50) pivotally connected to said driver housing mounting bracket, said driver housing movable between a first position and a second position up to about ninety (90) degrees away.

20. The remodeler luminaire fixture of claim 19 further comprising a wire way extending between said driver housing and said junction box.

21. The remodeler luminaire fixture of claim 19 further comprising stops (51) on one of said driver housing and said driver housing mounting bracket.

22. The remodeler luminaire fixture of claim 19 wherein said axis of rotation of said driver housing is vertical.

23. The remodeler luminaire fixture of claim 19 wherein said axis of rotation of said driver housing is other than vertical.

24. The remodeler luminaire fixture of claim 23 wherein said junction box has a pivotable door.

\* \* \* \* \*